Dec. 26, 1950  W. S. SCHAEFER ET AL  2,535,653
INSIDE BURR REMOVING APPARATUS
Filed Jan. 9, 1946  2 Sheets-Sheet 1
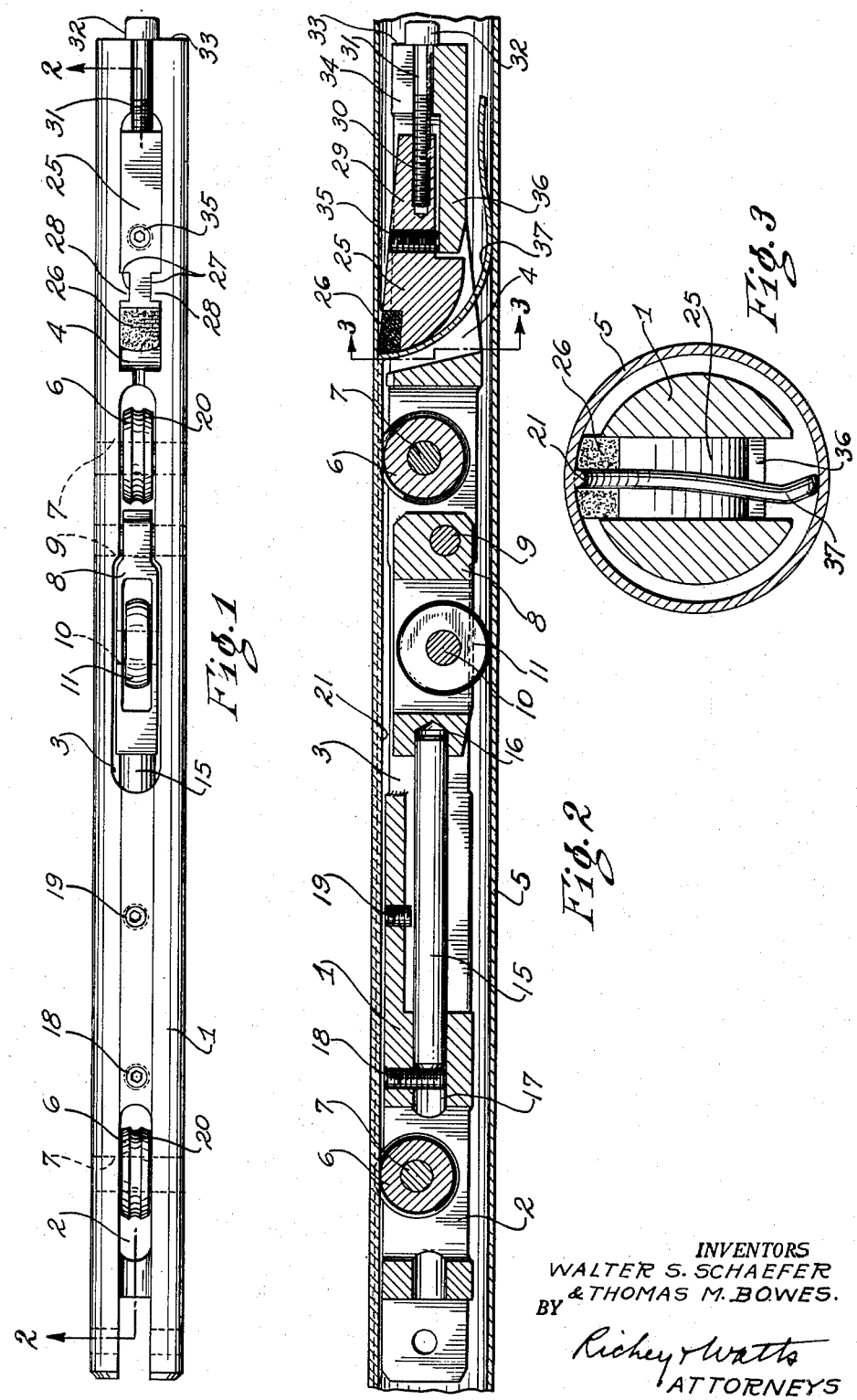
INVENTORS
WALTER S. SCHAEFER
& THOMAS M. BOWES.
BY Richey & Watts
ATTORNEYS

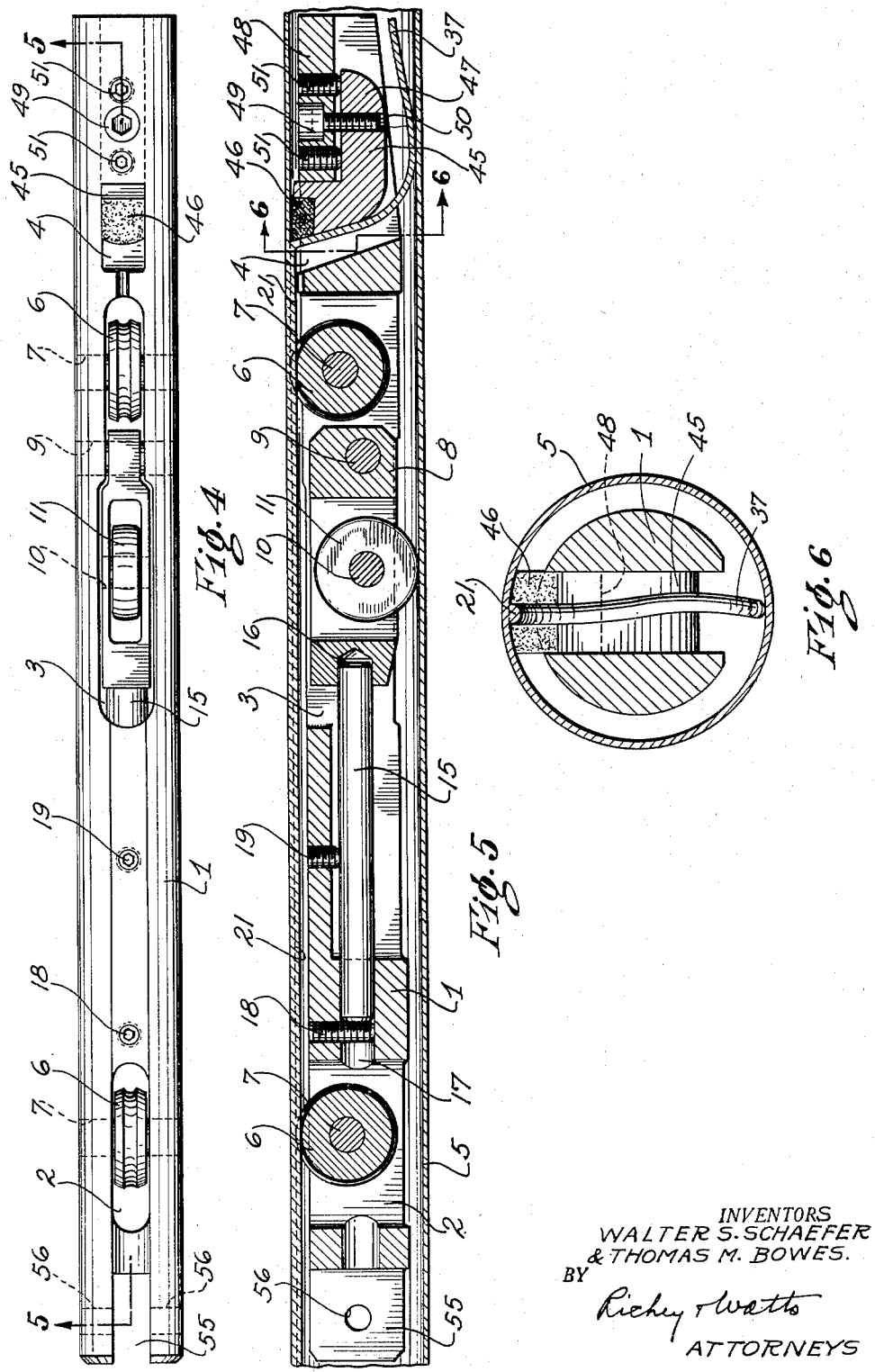

Patented Dec. 26, 1950

2,535,653

UNITED STATES PATENT OFFICE 2,535,653

INSIDE BURR REMOVING APPARATUS

Walter S. Schaefer, Euclid, and Thomas M. Bowes, South Euclid, Ohio, assignors to Republic Steel Corporation, Cleveland, Ohio, a corporation of New Jersey Application January 9, 1946, Serial No. 640,124

1 Claim. (Cl. 90—24)

This invention relates generally to the art of removing welding burrs from the inner surface of longitudinally welded tubular metal articles, and is particularly concerned with new apparatus for removing such burrs.

The prior burr removers comprised a plug with rollers which projected on opposite sides thereof and which in some instances were capable of moving relatively to an extent sufficient to compensate for slight variations in the inside diameter of the welded article. However, these burr removers were not capable of being adjusted to accommodate different sizes of welded articles and, as a result, burr removers were provided for each of the different sizes of the welded articles. This meant that a considerable number of burr removers, differing only from one another in small diametrical dimensions, had to be carried in stock when welded articles of a variety of different inside diameter sizes were being made.

Furthermore, these prior burr removers were not susceptible to adjustment of the burr cutting tool while the burr remover was in the article to be welded. Frequently it was necessary to adjust the cutting tool as, for example, when the seam was not properly welded or the cutting tool was not removing the proper amount of metal from the inside of the article. Any such adjustment of the cutting tool necessitated the removal of the article to expose the burr remover and permit adjustment of the cutting tool by affording access to the trailing end of the burr remover, where the tool adjusting means extended longitudinally of the burr remover.

According to the present invention we have provided a burr remover which can be adjusted to accommodate welded articles of a range of different inside diameters and can also be adjusted as regards the cutting tool and both adjustments may be made thru the open seam cleft of the article to be welded without removing the article from its position surrounding the burr remover.

In the drawings which accompany and form a part of this specification,

Figure 1 is a top plan view of one form of a burr remover embodying the present invention;

Figure 2 is a central, longitudinal, sectional view of the apparatus of Fig. 1, taken on line 2—2 thereof;

Figure 3 is a transverse sectional view taken on line 3—3 of Fig. 2;

Figure 4 is a top plan view of another form of apparatus embodying the present invention;

Figure 5 is a central, longitudinal, sectional view of the apparatus taken on line 5—5 of Fig. 4; and Figure 6 is a transverse sectional view taken on line 6—6 of Fig. 5.

In Figs. 1, 2 and 3 the burr remover comprises a plug 1 having a plurality of slots 2, 3 and 4 spaced apart axially therealong. Plug 1 is shown in operative position within a longitudinally welded metal tube 5 in Figs. 2 and 3.

Rollers 6 are mounted on fixed axles 7 which extend transversely of plug 1 and are disposed in slots 2 and 3 of the plug. A carriage 8 is disposed in part of slot 3 and is pivotally mounted on fixed axle 9 which extends transversely of the plug. The carriage 8 carries a fixed axle 10 on which is rotatably mounted a roller 11. A bendable member 15, shown here as a spring rod, is loosely fitted into a recess 16 in the free end of the carriage 8. The other end of member 15 may be similarly loosely fitted into a recess 17 in plug 1. An abutment 18 in the form of a headless screw is threaded transversely into plug 1 and recess 17, where it engages the end of member 15. Another headless screw 19 is threaded transversely thru plug 1 and bears against member 15 at a point between its ends.

It will be noted that rollers 6 project beyond one side of plug 1 and are circumferentially recessed as at 20 to straddle the welding burr 21 and engage the inner surface of the welded article 5 on both sides of the burr. It will also be noted that roller 11 projects beyond the opposite side of plug 1 and that screws 18 and 19 extend inwardly of the plug from the side thru which rollers 6 project.

It will be understood that when screw 19 is screwed inwardly against member 15 it may deflect or bend the latter and pivot carriage 8 about axle 9 and thereby vary the extent of projection of roller 11 beyond the surface of the plug opposite to that thru which rollers 6 project. When screw 19 is screwed inwardly against member 15 so as to cause roller 11 to extend further beyond the surface of the plug 1, the plug will accommodate welded articles of larger inside diameter. The spring action of the bendable member 15 allows the plug to accommodate itself to small differences in the inside diameter of the welded article. Pressure applied against roller 11 tending to reduce the extent of its projection beyond the side of plug 1, will result in deflection of member 15 and movement of roller 11 inwardly of plug 1. In this case member 15 bends about recess 17 and screw 19. Abutment screw 18 prevents endwise movement of member 15 in recess 17. Near the end of plug 1 a cutting tool 25 is located in slot 4. This tool has a cutting edge portion 26 of suitable composition at its forward end and has side recesses 27 which engagingly receive opposed shoulders 28. It will be understood that the tool 25 may be located at different positions along these shoulders. The trailing portion 29 of tool 25 has a longitudinally extending threaded recess 30 into which a threaded bolt 31 extends. The head 32 of this bolt bears against the trailing end surface 33 of plug 1 while the shank of the bolt lies in open-topped slot 34 of the plug. By tightening bolt 31 tool 25 may be held in predetermined position by shoulders 28 and bolt 31. A headless screw 35 is threaded in an opening extending thru tool 25 from the side of the apparatus opposed to the welding burr and at the inner end bears against the longitudinally projecting portion 36 of plug 1. The leading end of tool 25 is spaced rearwardly of the forward end of slot 4 and, together with the walls of that slot, defines a space thru which removed welding burr 37 may pass thru the plug.

Since screw 19 is accessible thru the open seam cleft of welded article 1, the extent of projection of roller 11 beyond the side of plug 1 may be adjusted while the plug is in an unwelded article. Since screw 35 is similarly accessible thru the open seam cleft of article 5, it may be adjusted to increase or decrease the depth of cut made by the cutting edge portion 26 of tool 25, it being understood that before such an adjustment is made bolt 31 is rotated to loosen the tool and after the adjustment is made the screw 31 is tightened to hold the tool in its adjusted position relative to shoulders 28.

Figs. 4, 5 and 6 show burr removing apparatus similar in many respects to that shown in Figs. 1, 2 and 3. In these figures parts similar to those shown in Figs. 1, 2 and 3 are similarly numbered and from this fact it will be understood that the foregoing description of those parts applies to these parts of Figs. 4, 5 and 6.

A cutting tool 45 is located in slot 4 near the trailing end of plug 1 and is provided with a cutting edge 46 of any suitable material. Trailing end portion 47 of tool 46 extends beneath portion 48 of plug 1. A socket-headed cap screw 49 extends thru an opening in portion 48 and into a screw threaded hole 50 in portion 47 of the cutting tool. Two headless screws 51 have screw threaded engagement in holes of portion 48 of plug 1 and at their inner ends engage the top surface of portion 47 of the tool. Adjustment of tool 45 transversely of plug 1 to vary the extent of projection of cutting edge 46 beyond the adjacent side of the plug may be readily accomplished thru the open seam cleft of a tubular article by adjusting screws 49 and 51. When it is desired to increase the amount of such projection socket screw 49 is loosened and screws 51 are backed out, after which screw 49 is tightened and brings tool 45 into contact with screws 51. When the extent of projection of the tool is to be decreased, screws 49 and 51 are loosened, screws 51 are advanced into the plug and then screw 49 is tightened.

In the apparatus of Figs. 4, 5 and 6, as in the apparatus of Figs. 1, 2 and 3, a passage is provided in slot 4 for movement of the severed burr metal 37 through the plug.

The plugs of Figs. 1, 2, 4 and 5 are provided with means at their leading ends for attachment to an anchorage. This means includes a slot 55 at the leading ends of the plugs and holes 56 thru which a pin may extend thru the plug and thru anchors in slots 55. As the drawings show, the illustrated burr removing apparatus is substantial in construction, consists of a small number of parts which are inexpensive to make and maintain, and are adjustable thru the open seam cleft of a tubular article both as regards the overall inside diameter of tubing with which they may be used and also as regards the depth of cut which may be made by the cutting tool.

Having thus described our invention so that others skilled in the art may be able to understand and practice the same, we state that what we desire to secure by Letters Patent is defined in what is claimed.

What is claimed is:

Apparatus for removing welding burr from the inner surface of a longitudinally welded tubular, metal article comprising a plug, a plurality of axially spaced rollers in the plug, each projecting beyond one side of the plug to engage the article on both sides of the welded burr, a carriage in the plug between said rollers and pivotally connected at one end to said plug, a roller in said carriage projecting beyond the opposite side of said plug to engage the article opposite said burr, and means for varying the extent of projection of said roller including a bendable spring rod extending longitudinally of said plug with its ends projecting into recesses in the carriage and plug, and adjustable means extending transversely of the plug from the side thereof adjacent to the welding burr and engageable with said bendable rod between its ends for bending the rod and moving the carriage roller outwardly to a predetermined fixed position or permitting the rod to bend and move said roller inwardly.

WALTER S. SCHAEFER.
THOMAS M. BOWES.

REFERENCES CITED

The following references are of record in the file of this patent:

UNITED STATES PATENTS

| Number | Name | Date |
|---|---|---|
| 2,053,831 | Jenkins | Sept. 8, 1936 |
| 2,286,513 | Sower | June 16, 1942 |